US010652850B2

(12) United States Patent
Landais et al.

(10) Patent No.: US 10,652,850 B2
(45) Date of Patent: May 12, 2020

(54) SUPPORT OF MOBILE-TERMINATED SHORT MESSAGE DELIVERY FOR A USER EQUIPMENT USING A POWER SAVING MECHANISM SUCH AS EXTENDED IDLE MODE DRX

(71) Applicant: Alcatel Lucent, Boulogne-Billancourt (FR)

(72) Inventors: Bruno Landais, Lannion (FR); Ulrich Wiehe, Hersfeld (DE)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/342,574

(22) Filed: Nov. 3, 2016

(65) Prior Publication Data

US 2017/0142679 A1 May 18, 2017

(30) Foreign Application Priority Data

Nov. 6, 2015 (EP) ..................................... 15306774

(51) Int. Cl.
*H04W 60/02* (2009.01)
*H04L 12/58* (2006.01)
(Continued)

(52) U.S. Cl.
CPC .............. *H04W 60/02* (2013.01); *H04L 51/38* (2013.01); *H04W 4/12* (2013.01); *H04W 8/04* (2013.01); *H04W 52/0216* (2013.01); *H04L 69/28* (2013.01); *H04W 76/28* (2018.02); *H04W 88/02* (2013.01); *H04W 88/16* (2013.01);
(Continued)

(58) Field of Classification Search
CPC ... H04W 60/02; H04W 52/0216; H04W 8/04; H04W 88/02; H04W 88/16; H04W 4/12; H04W 76/28; H04W 4/14; H04W 52/0225; H04W 52/0248; H04L 51/38;
(Continued)

(56) References Cited

U.S. PATENT DOCUMENTS

2015/0078154 A1* 3/2015 Jain .................... H04W 28/0242
370/230
2017/0064487 A1* 3/2017 Buckley .................. H04W 4/70

FOREIGN PATENT DOCUMENTS

CN 102884817 A 1/2013
CN 103037328 A 4/2013

OTHER PUBLICATIONS

Extended European Search Report 15306774.9 dated May 6, 2016.
Alcatel-Lucent et al. "Mobile Terminating SMS handling for extended Idle mode DRX". 3GPP Draft; C4-151804, 3rd Generation Partnership Project (3GPP), Mobile Competence Centre; 650, Route Des Lucioles; F-06921 Sophia-Antipolis Cedex; France, vol. CT WG4, No. Belgrade, Republic of Serbia; 2015012-2015016, (Oct. 16 2015), XP051020194.

(Continued)

*Primary Examiner* — Julio R Perez
(74) *Attorney, Agent, or Firm* — Harness, Dickey & Pierce, P.L.C.

(57) ABSTRACT

A mobile network entity configured to upon reception of a TFR message forwarding a SM towards a UE in extended idle mode DRX, including a SM-Delivery-Timer/Start-Time indicating the time used in the SM gateway SMSC to supervise the receipt of the TFR message, keep the SM for a specified time if the UE is expected to become reachable before the expiration of the timer, and page the UE. If the UE responds to this paging during this specified time, the mobile network entity configured to deliver the SM to the UE, and if the UE does not respond to this paging during this specified time, or if the UE is not expected to respond within this time, send towards a SM gateway SMSC a delivery failure and set a flag to record that the UE is currently not reachable.

16 Claims, 5 Drawing Sheets

(51) Int. Cl.
  *H04W 52/02*   (2009.01)
  *H04W 4/12*    (2009.01)
  *H04W 8/04*    (2009.01)
  *H04L 29/06*   (2006.01)
  *H04W 76/28*   (2018.01)
  *H04W 88/02*   (2009.01)
  *H04W 88/16*   (2009.01)

(52) U.S. Cl.
  CPC .......... *Y02D 70/1262* (2018.01); *Y02D 70/21* (2018.01); *Y02D 70/24* (2018.01)

(58) Field of Classification Search
  CPC ........ H04L 69/28; Y02D 70/21; Y02D 70/24; Y02D 70/1262
  USPC ...................................................... 455/435.1
  See application file for complete search history.

(56) References Cited

OTHER PUBLICATIONS

Qualcomm Incorporated: "Mobile Terminating SMS handlling for extended I-DRX". 3GPP Draft; 23272_CR0947R2_EDRX_(REL-13)_S2-152621_WAS2555_WAS2295_23272-D00_Edrx_Mt_SMS; 3rd Generation Partnership Project (3GPP), Mobile Competence Centre; 650, Route Des Lucioles; F-06921 Sophia, vol. SA WG2, No. Dubrovnik, Croatia, (Sep. 2015). XP051011844.

Chinese Office Action dated Aug. 5, 2019 for CN Application No. 201610975783.4.

European Office Action for corresponding European Patent Application No. 15306774.9 dated Mar. 26, 2020.

* cited by examiner

SUPPORT OF MOBILE-TERMINATED SHORT MESSAGE DELIVERY FOR A USER EQUIPMENT USING A POWER SAVING MECHANISM SUCH AS EXTENDED IDLE MODE DRX

CROSS-REFERENCE TO RELATED APPLICATIONS

The present application claims priority under 35 U.S.C. § 119 to European Patent Application No. 15306774.9, filed on Nov. 6, 2015, in the European Intellectual Property Office, the entire contents of which are hereby incorporated by reference.

BACKGROUND

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

The support of Mobile terminated Short Message delivery towards a User Equipment UE (or a Mobile Station MS) in such systems is specified in particular in 3GPP TS 23.040 and 3GPP TS 23.272. There is specified the capability of the system to transfer the SM to a User Equipment UE (or Mobile Station MS), and to provide information about the delivery of the short message either by a delivery report or a failure report with a specific mechanism for later delivery.

Optimizations or enhancements are now introduced in such networks and systems, for the support of new types of communications having new service requirements, such as Machine Type Communications (MTC). An example of such new service requirements is that mechanisms should be provided to lower the power consumption of MTC Devices.

An example of mechanism to lower the power consumption of Devices (or User Equipments), called extended idle mode DRX is specified in particular in 3GPP TS 23.682 and 3GPP TS 23.401. A UE with extended idle mode DRX applies longer period of discontinuous reception, up to several minutes, between the times when it wakes up to listens to possible paging occurences.

There is a need to improve the support of mobile-terminated short message delivery towards UEs using a power saving mechanism whereby the UE is momentarily not reachable (examples of such power saving mechanism including, though not limited to, Extended idle mode DRX). In particular, there is a need to improve the support of mobile-terminated short message delivery towards UEs in extended idle mode DRX.

Embodiments of the present invention in particular address such needs.

SUMMARY

These and other objects are achieved, in another aspect, by a mobile network entity capable of receiving a TFR message forwarding a SM towards a User Equipment UE, said mobile network entity configured to:
upon reception of a TFR message forwarding a SM towards a UE in extended idle mode DRX, including a SM-Delivery-Timer/Start-Time indicating the time used in the SM gateway SMSC to supervise the receipt of the TFA message, keep the SM for a specified time if the UE is expected to become reachable before the expiration of said timer, and page the UE,
if the UE responds to this paging during this specified time, deliver the SM to the UE,
if the UE does not respond to this paging during this specified time, or if the UE is not expected to respond within this time, send towards a SM gateway SMSC a delivery failure and set a flag to record that the UE is currently not reachable.

These and other objects are achieved, in another aspect, by a SM gateway SMSC capable of sending to a mobile network entity a TFR message forwarding a SM towards a User Equipment UE, over a SM delivery network not including a IP-SM-GW, said SMSC configured to:
include a SM-Delivery-Timer/Start-Time in said TFR message.

These and other objects are achieved, in another aspect, by a MSC/VLR, capable of receiving a TFR message forwarding a SM towards a User Equipment UE over a SM delivery network including SGs interface with an MME, said MSC/VLR configured to:
upon reception of a TFR message including a SM-Delivery-Timer/Start-Time timer indicating the time used in the SM gateway SMSC to supervise the receipt of the TFA message, include said timer in a Paging request sent over SGs to said MME.

These and other objects are achieved, in another aspect, by a mobile network entity capable of sending to a mobile subscriber database HSS a NOR message upon a User Equipment UE in extended idle mode DRX being reachable again, said mobile network entity configured to:
include in said NOR message a Max-UE-Availability-Time, indicating a time window until when the mobile network entity intends to maintain a signalling connection with the UE after a paging response from said UE.

These and other objects are achieved, in another aspect, by a mobile network entity capable of sending to a mobile subscriber database HSS a NOR message upon a User Equipment UE in extended idle mode DRX being reachable again, said mobile network entity configured to:
delay the sending of this NOR message, if said mobile network entity sent a TFA to the SM gateway SMSC reporting a SM delivery failure due to the UE being not reachable, to guarantee that the NOR message is received at the HSS after the HSS receives from the SM gateway SMSC the SM delivery failure report.

These and other objects are achieved, in another aspect, by a MME capable of detecting if a UE in extended idle mode DRX is reachable again, and interfacing with a MSC/VLR via a SGs interface, said MME configured to:
include in a UE-reachable message sent to said MSC/VLR, upon said UE being reachable again, a Max-UE-Availability-Time, indicating a time window until when the MME intends to maintain a signalling connection with the UE after a paging response from said UE.

These and other objects are achieved, in another aspect, by a mobile subscriber database HSS capable of receiving from a mobile network entity a NOR message indicating a User Equipment UE is reachable again, said mobile subscriber database configured to:
upon reception of a NOR message including a Max-UE-Availability-Time, indicating a time window until when the mobile network entity intends to maintain a signalling connection with the UE after a paging response from said UE, include said Max-UE-Availability-Time in an Alert message sent to a SM gateway SMSC.

These and other objects are achieved, in another aspect, by a SM gateway SMSC capable of receiving from a mobile subscriber database HSS entity an Alert message indicating a User Equipment UE is reachable again, said SM gateway SMSC configured to:

upon reception of a Alert message including a Max-UE-Availability-Time, indicating a time window until when the mobile network entity intends to maintain a signalling connection with the UE after a paging response from said UE, prioritize the retransmission of SMs which could not be delivered to said UE within the time indicated by the Max-UE-Availability-Time.

These and other objects are achieved, in another aspect, by a SM gateway SMSC capable of sending to a mobile network entity a TFR message forwarding a SM towards a User Equipment UE, said SMSC configured to:

include a Max retransmission Time, indicating for how long the SMSC is ready to store the SM if it cannot be delivered at once, in said TFR message.

These and other objects are achieved, in another aspect, by a mobile network entity capable of receiving a TFR message forwarding a SM towards a User Equipment UE, and of sending to a SM gateway a TFA message indicating success or failure of delivery of said SM to said UE, said mobile network entity configured to:

upon reception of a TFR message forwarding a SM message to a UE in extended idle DRX mode, including a Max retransmission Time indicating for how long the SMSC is ready to store the SM if it cannot be delivered at once, and if the UE is reachable within said Max retransmission Time:
Send a TFA message indicating delivery failure, with a time at which the SM should be re-sent by the SMSC.

These and other objects are achieved, in another aspect, by a SM gateway SMSC capable of receiving from a mobile network entity a TFA message in response to a TFR message forwarding a SM towards a User Equipment UE, said SMSC configured to:

Upon reception of a TFA message indicating delivery failure, with a time at which the SM should be re-sent by the SMSC, re-send the SM to the mobile network entity at said time.

These and other objects are achieved, in another aspect, by a MSC/VLR, capable of receiving a TFR message forwarding a SM towards a User Equipment UE over a SM delivery network including SGs interface with a MME, said MSC/VLR configured to:

upon reception of a TFR message including a Max retransmission Time indicating for how long the SMSC is ready to store the SM if it cannot be delivered at once, include said Max retransmission Time in a Paging Request sent over SGs to said MME.

These and other objects are achieved, in another aspect, by a MME capable of receiving a Paging Request from a MSC/VLR over a SGs interface, said MME configured to:

upon reception over SGs interface of a Paging Request for a UE in extended idle DRX mode, including a Max retransmission Time indicating for how long the SMSC is ready to store the SM if it cannot be delivered at once, and if the UE is reachable within said Max retransmission Time:
Send a UE Unreachable message indicating delivery failure, with a Retransmission Time at which the SM should be re-sent by the SMSC.

These and other objects are achieved, in another aspect, by a MSC/VLR, capable of receiving a UE Unreachable message over a SGs interface with a MME, and of sending to a SM gateway SMSC a TFA message indicating success or failure of SM delivery to said UE, said MSC/VLR configured to:

upon reception of a UE Unreachable message including a Retransmission Time at which the SM should be re-sent by the SMSC, include said Retransmission Time in a TFA message indicating failure of said SM delivery.

These and other objects are achieved, in other aspects, by method(s) for support of MT SM delivery for a UE in extended idle mode DRX, such method(s) including at least one step performed by at least one of above entities, said entities including: mobile network entity (such as MME, SGSN, MSC/VLR), mobile subscriber database (such as HSS), SM gateway (such as SMSC).

DETAILED DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION

Abbreviations

Figure 2:
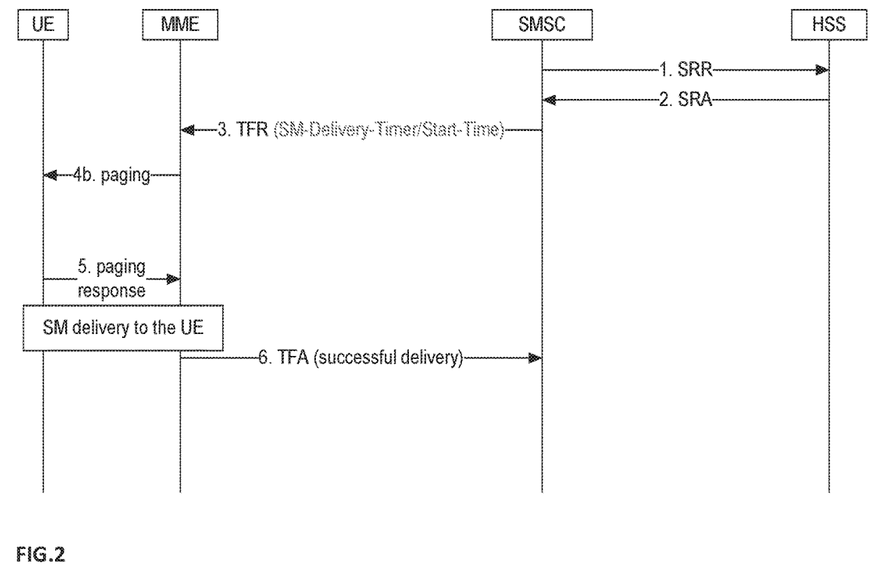
FIG. 2 is intended to illustrate a MT SMS procedure for UEs in extended idle mode DRX, according to first embodiments of the invention.
Figure 3:
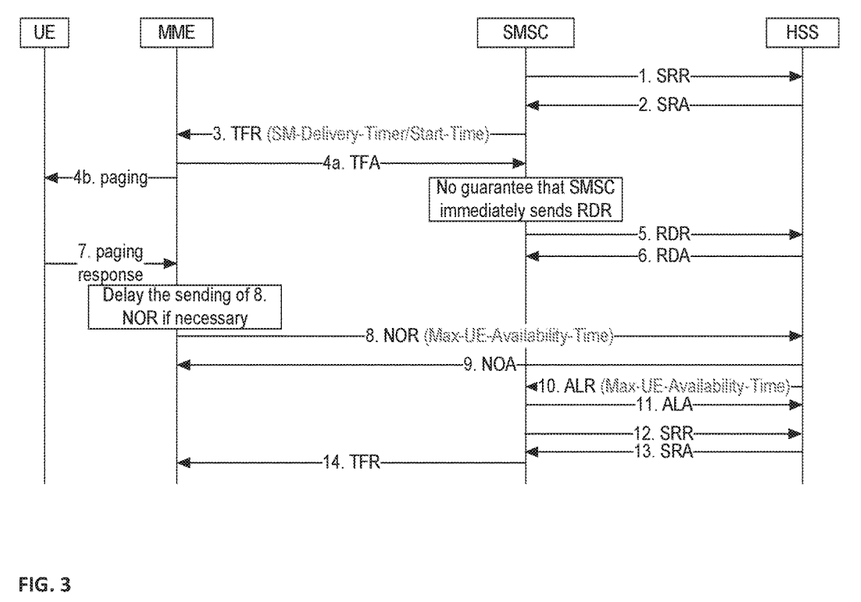
FIG. 3 is intended to illustrate a MT SMS procedure for UEs in extended idle mode DRX, according to second embodiments of the invention.
Figure 4:
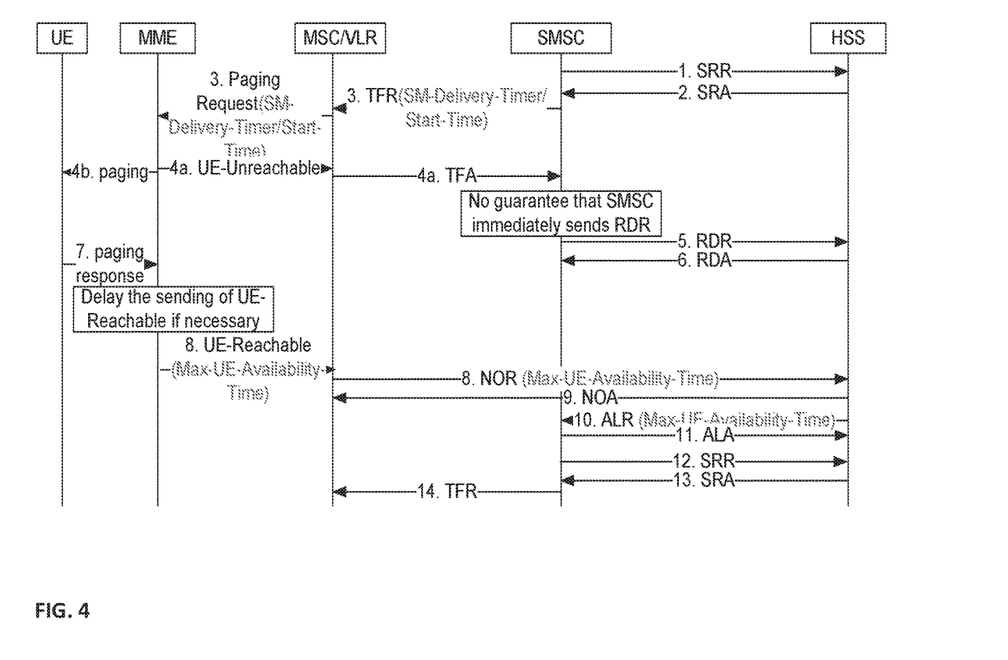
FIG. 4 is intended to illustrate a MT SMS procedure for UEs in extended idle mode DRX, according to third embodiments of the invention.
Figure 5:
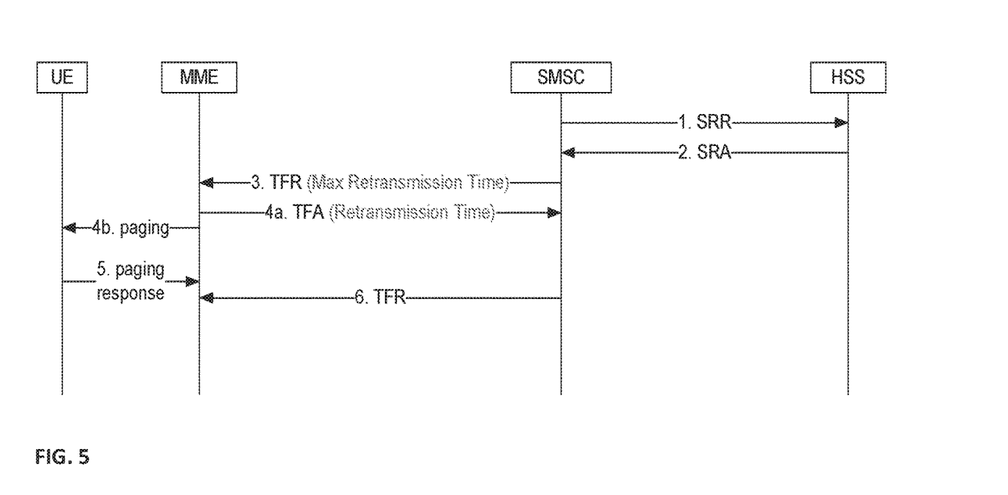
FIG. 5 is intended to illustrate a MT SMS procedure for UEs in extended idle mode DRX, according to fourth embodiments of the invention.
Figure 6:
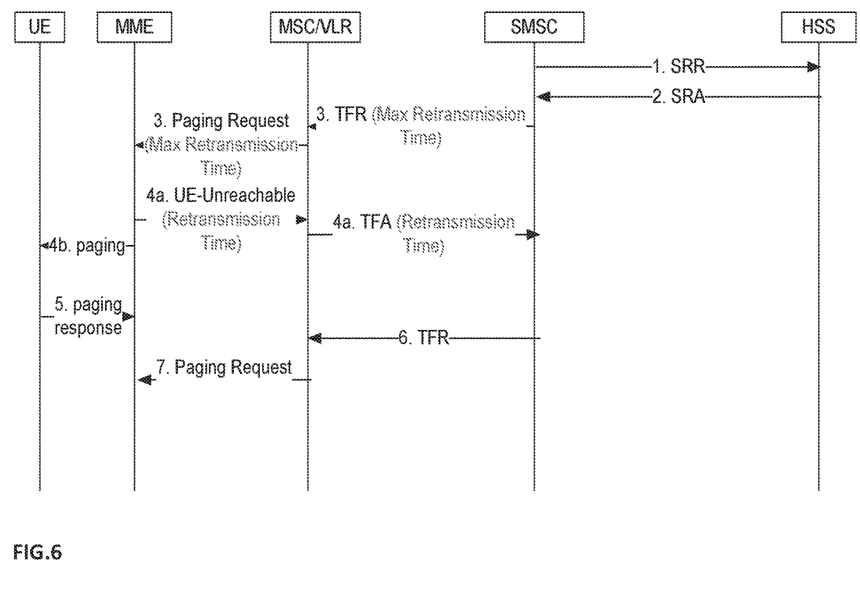
FIG. 6 is intended to illustrate a MT SMS procedure for UEs in extended idle mode DRX, according to fifth embodiments of the invention.

ALR Alert Service Centre Request
ALA Alert Service Centre Answer
AVP Attribute Value Pair
DEA Diameter EAP Answer
DER Diameter EAP Request
EPC Evolved Packet Core
EPS Evolved Packet System
E-UTRAN Evolved Universal Terrestrial Radio Access Network
HPLMN Home Public Land Mobile Network
HSS Home Subscriber Server
IP-SM-GW IP Short Message Gateway
LTE Long Term Evolution
MWD Message Waiting Data
NOR Notify Request
NOA Notify Answer
PLMN Public Land Mobile Network
RDR Report SM Delivery Status Request
RDA Report SM Delivery Status Answer
SMS-GMSC Gateway MSC for SMS
SRA Send-Routing-Info-for-SM-Answer
SRR Send-Routing-Info-for-SM-Request
TFR MT-Forward-Short-Message-Request TFA MT-Forward-Short-Message-Answer
UE User Equipment Embodiments of the invention may apply to various SM delivery scenarios, including:
- SM delivery via the MME, i.e. with the SMS-GMSC sending the SM directly to the MME
- SM delivery via the PS network (SGSN), i.e. with the SMS-GMSC sending the SM directly to the SGSN
- SM delivery via SGs, i.e. with the SMS-GMSC sending the SM to the MSC/VLR and the MSC/VLR sending the SM to the MME via SGs
- SM delivery via an IP-SM-GW
- SM delivery via an SMS-Router In the following, for illustrative purpose only, the first scenario (SM delivery via the MME) will be considered in FIGS. 1, 2, 3 and 5, and the scenario SM delivery via SGs will be considered in FIGS. 4 and 6.

INTRODUCTION

CR 23.272 #0947 (S2-152621) specifies the stage 2 solution to deliver MT Short Messages to UEs using extended idle mode DRX. The corresponding stage 3 requirements were specified and agreed in C4-151804 during the CT4#70bis meeting.

DESCRIPTION OF VARIOUS ASPECTS AND/OR EMBODIMENTS OF THE INVENTION

Figure 1:
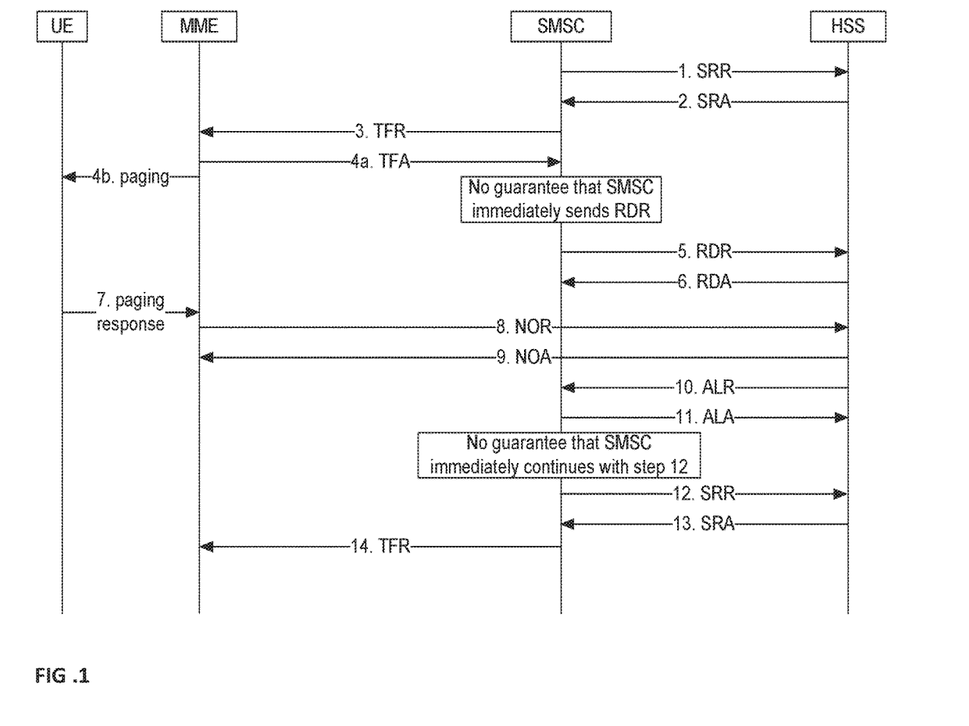
FIG. 1 is intended to illustrate drawbacks of a current MT SMS procedure for UEs in extended idle mode DRX.

The solution specified in stage 2 and the stage 3 CR agreed in CT4#70bis relies on the call flow and principles illustrated in FIG. 1 (showing the example of a direct MT SM delivery from the SMS-GMSC to the MME):

FIG. 1—SM retransmission triggered by NOR—current solution
1-2 The SMS-GMSC a Send-Routing-Info-for-SM-Request (SRR) command to the HSS to retrieve the address of the nodes serving the UE.
3 The SMS-GMSC sends an MT-Forward-Short-Message-Request (TFR) to the serving MME.
4. The MME rejects the TFR immediately if it knows that the UE is in extended idle mode DRX and not reachable shortly (e.g. within the next 10 seconds or within the time frame indicated by the SM-Delivery-Timer/SM-Delivery-Start-Time if received within the TFR) and the MME sets the MNRF flag. The MME also pages the UE.
NOTE:
The SM-Delivery-Timer/SM-Delivery-Start-Time parameters were introduced originally by CR 29.002 #0957, for prevention of timeout in the IP-SM-GW. Per TS 29.002, the SMS-GMSC sets these parameters when delivering an MT SM via an IP-SM-GW and the SRA includes the IP-SM-GW-Guidance IE (with the minimum Delivery Time Value and the recommended Delivery Time value). If so, the SM Delivery Timer Value in the TFR indicates the supervision timer value used by the SMS-GMSC.
See http://www.3gpp.org/ftp/tsg_CT/TSG_CT/TSGC_49_San_Antonio/Docs/CP-100468.zip
5-6. After possibly attempting to deliver the MT SM to the UE via the serving SGSN, the SMS-GMSC sends a Report-SM-Delivery-Status-Request (RDR) to the HSS with the indication that the SM delivery was unsuccessful. The HSS sets the MNRF (and possibly MNRG) flag, and the HSS stores the Service Center address in its Message Waiting Data (MWD) if a single-attempt-delivery was not requested.
7. When the UE responds to the paging request, a signalling connection is established between the UE and the MME, and the MME maintains this signalling connection for a duration it believes is sufficienty long to let time to the SMS-GMSC to retransmit the MT SM.
8-9 The MME sends a Notify-Request (NOR) to the HSS to signal that the UE has become reachable.
10-11 The HSS sends an Alert-Service-Center-Request (ALR) to the Service Center to trigger the retransmission of the MT SM.
12-14 The SC and SMS-GMSC retransmits the MT SM, after an additional SRR query to the HSS.

The solution presents the following merits:
a. The SM retransmission is triggered only when UE is really known to be reachable.
b. The SM retransmission succeeds if the eDRX period has been renegotiated in-between (e.g. due to UE moving to a different MME/SGSN, or due to UE establishing a new PDN connection)
c. Minimal (or no) impacts on SMS-GMSC
d. The MNRF flag is set in HSS. So subsequent MT SMs to the same UE do not trigger new TFR commands to the MME until the UE is reported to be reachable to the HSS.

The solution has however the following potential issues:
e. Every MT SM for UEs in eDRX (with an eDRX period >about 10 s or within the time frame indicated by the SM-Delivery-Timer/SM-Delivery-Start-Time if received within the TFR) will cause systematically 4 extra pair of messages at the HSS (RDR, NOR, ALR and SRR). Prior to the introduction of eDRX, these messages are triggered when the UE is not reachable, which should remain normally a rather rare case (for UEs with an always-on connectivity). With eDRX, MT SMs may cause substantial additional signalling to the HSS.
f. There is a potential risk of messages being received un-synchronized at the HSS, i.e. that with short time periods between the TFA and NOR messages (e.g. short eDRX period s of 5, 10 or 20 s), the SMS-GMSC sends the RDR to the HSS after the HSS receives the NOR from the MME. E.g. if the SMS-GMSC gets both an MME and SGSN addresses in the SRA, the SMS-GMSC can send a TFR to the SGSN after getting the TFA from the MME, before sending the RDR to the HSS.
If the NOR arrives at the HSS before the RDR message, the HSS will not trigger the SC to retransmit the SM. Besides, the HSS would set its MNRF flag while the MNRF flag is no longer set at the MME, resulting in all subsequent MT SMs to not be sent to the MME.
g. There is no synchronisation between the SC and the MME about the time period during which the MME maintains the signalling connection with the UE. So there is no guarantee that the SMS-GMSC retransmits the SM during the time window where the signalling connection is maintained (e.g. SMS-GMSC overload).
h. Single-attempt-delivery SM cannot be transmitted to the UE if this procedure is used and if MWD is not used for single-attempt-delivery SM (as currently specified).

The following proposals (including different aspects of the invention) are suggested to mitigate these potential issues.

Prop1:

To avoid the risk of messages being not synchronized at the HSS, it is proposed to add a note in the stage 3 CR reflecting that the above mechanism is not intended for UEs which are known to wake up shortly (e.g. within the next 10 seconds) as enough time needs to elapse, between the sending of the TFA and the subsequent NOR towards the HSS, for the RDR to be sent beforehand from the SMS-GMSC to the HSS. The MME/SGSN should delay the sending of NOR if needed to guarantee synchronized reception of RDR and NOR at the HSS (e.g. if the UE originates signalling shortly after the sending of TFA).

Prop2:

Additionally, it is also proposed to include the SM-Delivery-Timer and SM-Delivery-Start-Time IEs in the TFR to let the MME/SGSN know until when it can send the TFA, regardless of whether the MT SM transmission involves an IP-SM-GW or not. This would allow MME/SGSN to send the SM to the UE without any SM retransmission, i.e. avoid triggering the above solution, if the UE is waking up within the time frame indicated by the SM-Delivery-Timer/SM-Delivery-Start-Time (e.g. within the next 30 s), and thus solve the messages synchronization issue at the HSS.

An embodiment according to Prop2 is illustrated in FIG. 2 (showing the case where the SM is delivered without SM retransmission) and FIG. 3 (showing the case where the SM is delivered with SM retransmission).

Prop3:

It is proposed to include a new Maximum-UE-Availability-Time in the NOR and ALR messages, indicating the time window until when the MME/SGSN intends to maintain the signalling connection with the UE after the paging response (e.g. 30 seconds). This would let the SC know that it should prioritize the retransmission of SMs sent to UEs in eDRX. Note that since the MME and HSS resets their MNRF flag when exchanging the NOR message, even if the SC cannot retransmit the SM in the indicated time window, the SC (and SMS-GMSC) needs to resend a TFR to the MME/SGSN to re-arm the MNRF flag.

An embodiment according to Prop3 is illustrated in FIG. 3 and FIG. 4.

While it is fine in principle to rely on this solution for eDRX periods which are quite long (e.g. >10 minutes), it can become a concern to cause signalling overhead at the HSS for shorter eDRX periods (e.g. <10 minutes). With shorter eDRX periods, the risks that the UE becomes unreachable (e.g. detaches or renegotiates its eDRX period) at its next expected paging time, or that unnecessary TFRs are sent to the MME for other MT SMs, remains minimal.

Prop4:

It is proposed to define the following optional solution:

1-2 Same as in FIG. 1

3 The SMS-GMSC indicates in the TFR whether it supports this optional procedure by including a new Max Retransmission Time AVP (e.g. 5 to 10 minutes), which indicates for how long the SMS-GMSC is ready to store the SM if it cannot be delivered at once.

4 The MME fallbacks to the solution of FIG. 1 if the TFR does not include the Max Retransmission Time AVP. Otherwise, if the UE is reachable within the Max Retransmission time provided in the TFR, the MME sends immediately a TFA negative answer/Error with the time at which the SM should be resent by the SMS-GMSC. The MME does NOT set the MNRF flag. The MME also pages the UE.

The SMS-GMSC does NOT send a RDR to the HSS. The SMS-GMSC should not regard the SM retransmission as a second attempt for a single-attempt-delivery-SM.

5 The MME does NOT send a NOR to the HSS since the MNRF flag was not set.

6 The SMS GMSC retransmits the SM at the time which was indicated in the TFA. The TFR should NOT include a Max Retransmission Time AVP, so as to fallback to the default solution if the UE is not reachable at the time that was indicated to the SMS-GMSC.

An embodiment according to Prop4 is illustrated in FIGS. 5 and 6.

This option presents the following merits:

a. MT SM for UEs in eDRX does NOT cause any extra HSS signalling
b. No issue with short eDRX period (e.g. up to 20 s) of synchronization of messages received at HSS
c. Single-attempt-delivery SM can be transmitted to the UE if this procedure is used (without the need to use MWD for single-attempt-delivery SM as currently specified).

The solution has the following drawbacks:

a. SM retransmission is triggered w/o knowing for sure whether the UE is really reachable (e.g. the UE may have detached, may be in a tunnel, eDRX period may have been renegotiated . . . )
b. Some more impacts on SMS-GMSC (extended buffering' of MT-SM e.g. for up to 5-10 min)
c. The MNRF flag is NOT set in the HSS, so subsequent MT SM to the same UE from a different SMS-GMSC will trigger new MT Forward SM Request to MME for UEs which are unreachable.
d. Introduces a $2^{nd}$ method to deliver MT SMS for UEs using extended idle mode DRX.

The first solution (FIG. 2, 3) would be the default (mandatory) solution to support, and the fallback solution when the $2^{nd}$ optional solution (FIG. 5) cannot be used. The first solution is more intended for cases where the UE is expected not to respond to paging e.g. within the next 10 min, while the second solution would be more intended for UEs expected to respond e.g. within the next 10 min.

The issues and proposals discussed above apply whatever the solution used to deliver the SMS:

SM delivery via the MME, i.e. with the SMS-GMSC sending the SM directly to the MME SM delivery via the PS network (SGSN), i.e. with the SMS-GMSC sending the SM directly to the SGSN SM delivery via SGs, i.e. with the SMS-GMSC sending the SM to the MSC/VLR and the MSC/VLR sending the SM to the MME via SGs SM delivery via an IP-SM-GW SM delivery via an SMS-Router FIGS. 4 and 6 show the corresponding call flows for SMS delivery via SGs.

Note: FIGS. 4 and 6 are represented with the same (Diameter) messages as in the other figures. It is intended though to refer here to the corresponding MAP messages (Diameter is not supported by MSC/VLR).

Various aspects of the invention include (though not being limited to) following aspects.

An aspect is a mobile network entity capable of receiving a TFR message forwarding a SM towards a User Equipment UE, said mobile network entity configured to:

upon reception of a TFR message forwarding a SM towards a UE in extended idle mode DRX, including a SM-Delivery-Timer/Start-Time indicating the time used in the SM gateway SMSC to supervise the receipt of the TFA message, keep the SM for a specified time if the UE is expected to become reachable before the expiration of said timer, and page the UE, if the UE responds to this paging during this specified time, deliver the SM to the UE, if the UE does not respond to this paging during this specified time, or if the UE is not expected to respond within this time, send towards a SM gateway SMSC a delivery failure and set a flag to record that the UE is currently not reachable.

Another aspect is a SM gateway SMSC capable of sending to a mobile network entity a TFR message forwarding a SM towards a User Equipment UE, over a SM delivery network not including a IP-SM-GW, said SMSC configured to:

include a SM-Delivery-Timer/Start-Time in said TFR message.

Another aspect is a MSC/VLR, capable of receiving a TFR message forwarding a SM towards a User Equipment UE over a SM delivery network including SGs interface with an MME, said MSC/VLR configured to:

upon reception of a TFR message including a SM-Delivery-Timer/Start-Time timer indicating the time used in the SM gateway SMSC to supervise the receipt of the TFA message, include said timer in a Paging request sent over SGs to said MME.

Another aspect is a mobile network entity capable of sending to a mobile subscriber database HSS a NOR message upon a User Equipment UE in extended idle mode DRX being reachable again, said mobile network entity configured to:

include in said NOR message a Max-UE-Availability-Time, indicating a time window until when the mobile network entity intends to maintain a signalling connection with the UE after a paging response from said UE.

Another aspect is a mobile network entity capable of sending to a mobile subscriber database HSS a NOR message upon a User Equipment UE in extended idle mode DRX being reachable again, said mobile network entity configured to:

delay the sending of this NOR message, if said mobile network entity sent a TFA to the SM gateway SMSC reporting a SM delivery failure due to the UE being not reachable, to guarantee that the NOR message is received at the HSS after the HSS receives from the SM gateway SMSC the SM delivery failure report.

Another aspect is a MME capable of detecting if a UE in extended idle mode DRX is reachable again, and interfacing with a MSC/VLR via a SGs interface, said MME configured to:

include in a UE-reachable message sent to said MSC/VLR, upon said UE being reachable again, a Max-UE-Availability-Time, indicating a time window until when the MME intends to maintain a signalling connection with the UE after a paging response from said UE.

Another aspect is a mobile subscriber database HSS capable of receiving from a mobile network entity a NOR message indicating a User Equipment UE is reachable again, said mobile subscriber database configured to:

upon reception of a NOR message including a Max-UE-Availability-Time, indicating a time window until when the mobile network entity intends to maintain a signalling connection with the UE after a paging response from said UE, include said Max-UE-Availability-Time in an Alert message sent to a SM gateway SMSC.

Another aspect is a SM gateway SMSC capable of receiving from a mobile subscriber database HSS entity an Alert message indicating a User Equipment UE is reachable again, said SM gateway SMSC configured to:

upon reception of a Alert message including a Max-UE-Availability-Time, indicating a time window until when the mobile network entity intends to maintain a signalling connection with the UE after a paging response from said UE, prioritize the retransmission of SMs which could not be delivered to said UE within the time indicated by the Max-UE-Availability-Time.

Another aspect is a SM gateway SMSC capable of sending to a mobile network entity a TFR message forwarding a SM towards a User Equipment UE, said SMSC configured to:

include a Max retransmission Time, indicating for how long the SMSC is ready to store the SM if it cannot be delivered at once, in said TFR message.

Another aspect is a mobile network entity capable of receiving a TFR message forwarding a SM towards a User Equipment UE, and of sending to a SM gateway a TFA message indicating success or failure of delivery of said SM to said UE, said mobile network entity configured to:

upon reception of a TFR message forwarding a SM message to a UE in extended idle DRX mode, including a Max retransmission Time indicating for how long the SMSC is ready to store the SM if it cannot be delivered at once, and if the UE is reachable within said Max retransmission Time:

Send a TFA message indicating delivery failure, with a time at which the SM should be re-sent by the SMSC.

In an embodiment, said mobile network entity is configured to:

Send said TFA message indicating delivery failure, with a time at which the SM should be re-sent by the SMSC, without setting the UE not reachable flag.

Another aspect is a SM gateway SMSC capable of receiving from a mobile network entity a TFA message in response to a TFR message forwarding a SM towards a User Equipment UE, said SMSC configured to:

Upon reception of a TFA message indicating delivery failure, with a time at which the SM should be re-sent by the SMSC, re-send the SM to the mobile network entity at said time.

Another aspect is a MSC/VLR, capable of receiving a TFR message forwarding a SM towards a User Equipment UE over a SM delivery network including SGs interface with a MME, said MSC/VLR configured to:

upon reception of a TFR message including a Max retransmission Time indicating for how long the SMSC is ready to store the SM if it cannot be delivered at once, include said Max retransmission Time in a Paging Request sent over SGs to said MME.

Another aspect is a MME capable of receiving a Paging Request from a MSC/VLR over a SGs interface, said MME configured to:

upon reception over SGs interface of a Paging Request for a UE in extended idle DRX mode, including a Max retransmission Time indicating for how long the SMSC is ready to store the SM if it cannot be delivered at once, and if the UE is reachable within said Max retransmission Time:

Send a UE Unreachable message indicating delivery failure, with a Retransmission Time at which the SM should be re-sent by the SMSC.

Another aspect is a MSC/VLR, capable of receiving a UE Unreachable message over a SGs interface with a MME, and of sending to a SM gateway SMSC a TFA message indicating success or failure of SM delivery to said UE, said MSC/VLR configured to:
upon reception of a UE Unreachable message including a Retransmission Time at which the SM should be re-sent by the SMSC, include said Retransmission Time in a TFA message indicating failure of said SM delivery.

Other aspects relate to method(s) for support of MT SM delivery for a UE in extended idle mode DRX, such method(s) including at least one step performed by at least one of above entities, including: mobile network entity (such as MME, SGSN, MSC/VLR), mobile subscriber database (such as HSS), SM gateway (such as SMSC).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising circuitry configured to:
receive a mobile-terminating-forward-short-message-request message for forwarding a short message towards a user equipment,
determine if the received mobile-terminating-forward-short-message-request message includes a short message delivery timer/short message delivery start time, the short message delivery timer/short message delivery start time indicating a time used in a short message gateway to supervise a receipt of a mobile-terminating-forward-short-message-answer message,
determine if the user equipment using a power saving mechanism is waking up within a time frame indicated by the short message delivery timer/short message delivery start time, and
if the user equipment using the power saving mechanism is waking up within the time frame indicated by the short message delivery timer/short message delivery start time, deliver the short message to the user equipment without short message retransmission.

2. The apparatus-according to claim 1, wherein:
the power saving mechanism includes extended idle mode discontinuous reception.

3. An apparatus comprising circuitry configured to:
determine that a user equipment using a power saving mechanism becomes reachable by receiving a paging response from the user equipment, and
if the user equipment using the power saving mechanism becomes reachable, send towards a home subscriber server a notify request message including a max-user-equipment-availability-time, the max-user-equipment-availability-time indicating a time window in which a signaling connection is maintained with the user equipment after a paging response from the user equipment.

4. The apparatus according to claim 3, wherein:
the max-user-equipment-availability time is an indication for a service center that the service center is to prioritize retransmission of a short message sent to the user equipment using the power saving mechanism.

5. The apparatus according to claim 3, wherein:
the power saving mechanism includes extended idle mode discontinuous reception.

6. An apparatus comprising circuitry configured to:
receive a mobile-terminating-forward-short-message-request message for forwarding a short message towards a user equipment,
determine if the received mobile-terminating-forward-short-message-request message includes a max retransmission time indicating for how long a short message gateway is ready to store the short message when it cannot be delivered at once,
determine if the user equipment is using a power saving mechanism, and
if the user equipment is reachable within the max retransmission time, sending, to the short message gateway, a mobile-terminating-forward-short-message-answer message indicating failure of delivery of the short message to the user equipment with a time at which the short message should be re-sent by the short message gateway.

7. The apparatus according to claim 6, further comprising circuitry configured to
send the mobile-terminating-forward-short-message-answer message indicating delivery failure, with a time at which the short message should be re-sent by the short message gateway, without setting the user equipment not reachable flag.

8. The apparatus according to claim 6, wherein:
the power saving mechanism includes extended idle mode discontinuous reception.

9. An apparatus comprising circuitry configured to:
receive a request message for forwarding a short message towards a user equipment over a short message delivery network including a SGs interface with a mobility management entity, the request message including a short-message-delivery-timer/short-message delivery start-time indicating the time used in a short message gateway to supervise reception of an answer message,
send the short-message-delivery-timer/short-message-delivery start-time in a paging request over the SGs interface to the mobility management entity.

10. An apparatus comprising circuitry configured to:
determine that a user equipment using a power saving mechanism becomes reachable by receiving a paging response from the user equipment, and
if the user equipment using the power saving mechanism becomes reachable, send towards a mobile switching center/visitor location register over a SGs interface a user-equipment-reachable message including a max-user-equipment-availability-time indicating a time window until when a signaling connection is maintained with the user equipment after the paging response from the user equipment.

11. The apparatus according to claim 10, wherein the max user-equipment-availability-time indicates to a service center that the service center is to prioritize retransmission of a short message to the user equipment using the power saving mechanism.

12. The apparatus according to claim 10, wherein said power saving mechanism includes extended idle mode discontinuous reception.

13. An apparatus comprising circuitry configured to:
receive, from a short message gateway, a request message for forwarding a short message towards a user equipment over a short message delivery network including a SGs interface with a mobility management entity, determine that the request message includes a max retransmission time indicating for how long the short message gateway is ready to store the short message if the short message cannot be delivered at once, and send a paging request over SGs interface to the mobility management entity, the paging request including the max retransmission time.

14. An apparatus, comprising circuitry configured to:

receive, from a mobile switching center/visitor location register, a paging request for a user equipment, determine if the user equipment using a power saving mechanism is reachable within a max retransmission time included in the paging request, the max retransmission time indicating for how long a short message gateway is ready to store a short message when the short message cannot be delivered at once, if the user equipment is reachable within the max retransmission time, send a user equipment unreachable message indicating delivery failure, the user equipment unreachable message including a retransmission time at which the short message should be re-sent by the short message gateway.

15. The apparatus according to claim 14, wherein said power saving mechanism includes extended idle mode discontinuous reception.

16. An apparatus comprising circuitry configured to:

receive a user equipment unreachable message over an interface with a mobility management entity, the user equipment unreachable message including a retransmission time at which a short message should be re-sent, and send an answer message to a short message gateway indicating failure of delivery of the short message to the user equipment, the answer message including the retransmission time at which the short message should be re-sent.

* * * * *